US012645297B2

(12) United States Patent
Papageorgiou et al.

(10) Patent No.: US 12,645,297 B2
(45) Date of Patent: Jun. 2, 2026

(54) INTERPOSER FOR HIGH-DENSITY AND HIGH-CHANNEL COUNT NEURAL INTERFACE

(71) Applicant: PRECISION NEUROSCIENCE CORPORATION, New York, NY (US)

(72) Inventors: Demetrios Papageorgiou, New York, NY (US); Mark Hettick, New York, NY (US); Manuel Monge, New York, NY (US); Benjamin I. Rapoport, New York, NY (US)

(73) Assignee: PRECISION NEUROSCIENCE CORPORATION, New York, NY (US)

( * ) Notice: Subject to any disclaimer, the term of this patent is extended or adjusted under 35 U.S.C. 154(b) by 0 days.

(21) Appl. No.: 19/042,789

(22) Filed: Jan. 31, 2025

(65) Prior Publication Data

US 2025/0251794 A1     Aug. 7, 2025

Related U.S. Application Data

(60) Provisional application No. 63/548,649, filed on Feb. 1, 2024.

(51) Int. Cl.
*G06F 3/01*        (2006.01)
(52) U.S. Cl.
CPC .................................... *G06F 3/015* (2013.01)
(58) Field of Classification Search
CPC .. G06F 3/015; A61B 5/37; A61B 5/31; A61B 2562/125; A61B 2562/164; A61B 2562/227; A61B 5/293; A61N 1/0531
See application file for complete search history.

(56) References Cited

U.S. PATENT DOCUMENTS 5,709,689 A    1/1998   Ferrante et al.
5,910,282 A    6/1999   Grozdanovski et al.
(Continued)

FOREIGN PATENT DOCUMENTS

AU       2020428944 A1    9/2022
AU       2024203319 A1    6/2024
(Continued)

OTHER PUBLICATIONS

Beck C., et al., "Block Cipher Based Security for Severely Resource-Constrained Implantable Medical Devices," In Proceedings of the 4th International Symposium on Applied Sciences in Biomedical and Communication Technologies (ISABEL '11) Association for Computing Machinery, Oct. 26, 2011, No. 62, pp. 1-5.
(Continued)

*Primary Examiner* — Cuong B Nguyen
(74) *Attorney, Agent, or Firm* — DLA Piper LLP US

(57) ABSTRACT

Systems and methods for an interposer that bridges finely spaced connections from an electrode array to corresponding electronics of a neural interface. A neural interface for subdural implantation may include an electrode array including a flexible substrate and a plurality of electrodes arranged on the flexible substrate, a first pad arranged on the flexible substrate, wherein the first pad is electrically connected to the plurality of electrodes. The neural interface may include an interposer including a printed circuit board (PCB), a second pad arranged on the PCB, a plurality of connectors arranged on the PCB, wherein the plurality of connectors are electrically connected to the second pad, and an epoxy electrically connecting the first pad and the second pad, wherein the epoxy comprises a conductive material.

27 Claims, 10 Drawing Sheets

300

(56) References Cited

U.S. PATENT DOCUMENTS

| | | | |
|---|---|---|---|
| 6,831,991 | B2 | 12/2004 | Fridrich et al. |
| 7,389,144 | B1 | 6/2008 | Osorio et al. |
| 7,818,061 | B1 | 10/2010 | Palmer |
| 7,925,350 | B1 | 4/2011 | Palmer |
| 8,156,568 | B2 | 4/2012 | Gaitas et al. |
| 8,170,670 | B2 | 5/2012 | Stubbs et al. |
| 8,515,538 | B1 | 8/2013 | Osorio et al. |
| 8,516,568 | B2 | 8/2013 | Cohen |
| 8,546,568 | B2 | 10/2013 | Inouye et al. |
| 8,634,918 | B2 | 1/2014 | Chambers |
| 9,314,618 | B2 | 4/2016 | Imran et al. |
| 9,549,704 | B1 | 1/2017 | Buerger et al. |
| 10,135,849 | B2 | 11/2018 | Jha et al. |
| 10,265,081 | B2 | 4/2019 | Kennedy et al. |
| 10,363,420 | B2 | 7/2019 | Fried et al. |
| 11,013,923 | B1 | 5/2021 | Eubanks |
| 11,185,684 | B2 | 11/2021 | Cadwell |
| 11,640,204 | B2 | 5/2023 | Shenoy et al. |
| 12,008,987 | B2 | 6/2024 | Stavisky et al. |
| 2001/0054758 | A1* | 12/2001 | Isaak ........................ H05K 1/141 |
| | | | 438/109 |
| 2003/0057506 | A1 | 3/2003 | Li et al. |
| 2005/0228421 | A1 | 10/2005 | Bilenski et al. |
| 2005/0261934 | A1 | 11/2005 | Thompson |
| 2006/0015153 | A1 | 1/2006 | Gliner et al. |
| 2006/0106431 | A1 | 5/2006 | Wyler et al. |
| 2006/0253163 | A1 | 11/2006 | Stubbs et al. |
| 2007/0005691 | A1 | 1/2007 | Pushparaj |
| 2007/0282398 | A1 | 12/2007 | Healy et al. |
| 2009/0082829 | A1 | 3/2009 | Panken et al. |
| 2009/0088763 | A1 | 4/2009 | Aram et al. |
| 2009/0132061 | A1 | 5/2009 | Stubbs et al. |
| 2009/0312817 | A1 | 12/2009 | Hogle et al. |
| 2011/0093052 | A1 | 4/2011 | Anderson et al. |
| 2011/0245835 | A1 | 10/2011 | Dodds et al. |
| 2012/0139269 | A1 | 6/2012 | Kouzuma |
| 2012/0277834 | A1 | 11/2012 | Mercanzini et al. |
| 2012/0302959 | A1 | 11/2012 | Fielder et al. |
| 2013/0014982 | A1* | 1/2013 | Segawa .................. H05K 1/142 |
| | | | 29/830 |
| 2013/0108046 | A1 | 5/2013 | Andersen |
| 2013/0144362 | A1 | 6/2013 | Lee |
| 2013/0144365 | A1 | 6/2013 | Kipke et al. |
| 2013/0331856 | A1 | 12/2013 | Sage |
| 2014/0051960 | A1 | 2/2014 | Badower et al. |
| 2014/0100586 | A1 | 4/2014 | Pianca et al. |
| 2014/0185805 | A1 | 7/2014 | Andersen |
| 2014/0194944 | A1 | 7/2014 | Romanelli et al. |
| 2015/0111930 | A1 | 4/2015 | Aung-Din |
| 2015/0151114 | A1 | 6/2015 | Black et al. |
| 2015/0265180 | A1 | 9/2015 | Venkatesan et al. |
| 2015/0367122 | A1 | 12/2015 | Morshed et al. |
| 2016/0007874 | A1 | 1/2016 | Ma et al. |
| 2016/0120457 | A1 | 5/2016 | Wu et al. |
| 2016/0174863 | A1 | 6/2016 | Foerster et al. |
| 2016/0331994 | A1 | 11/2016 | Smith et al. |
| 2017/0001003 | A1 | 1/2017 | Pivonka et al. |
| 2017/0100580 | A1 | 4/2017 | Olson |
| 2017/0108926 | A1 | 4/2017 | Moon et al. |
| 2017/0113046 | A1 | 4/2017 | Fried et al. |
| 2017/0224980 | A1 | 8/2017 | Grasso et al. |
| 2017/0235663 | A1 | 8/2017 | Kattepur et al. |
| 2017/0246452 | A1 | 8/2017 | Liu et al. |
| 2017/0259072 | A1 | 9/2017 | Newham et al. |
| 2018/0078767 | A1 | 3/2018 | Rapoport et al. |
| 2018/0236221 | A1 | 8/2018 | Opie et al. |
| 2018/0332009 | A1 | 11/2018 | Lange |
| 2019/0110754 | A1 | 4/2019 | Rao et al. |
| 2019/0134396 | A1 | 5/2019 | Toth et al. |
| 2019/0150774 | A1 | 5/2019 | Brinkmann et al. |
| 2019/0282817 | A1 | 9/2019 | Muller et al. |
| 2019/0333505 | A1 | 10/2019 | Stavisky et al. |
| 2020/0061374 | A1 | 2/2020 | Mitchell |
| 2020/0069427 | A1 | 3/2020 | Swennen et al. |
| 2020/0078586 | A1 | 3/2020 | Wijseundara et al. |
| 2020/0155828 | A1 | 5/2020 | Shepard et al. |
| 2020/0206503 | A1 | 7/2020 | Ganzer et al. |
| 2020/0215318 | A1 | 7/2020 | Fielder et al. |
| 2020/0222010 | A1 | 7/2020 | Howard |
| 2020/0310442 | A1 | 10/2020 | Halder et al. |
| 2020/0337579 | A1 | 10/2020 | Auerbach et al. |
| 2020/0364539 | A1 | 11/2020 | Anisimov et al. |
| 2021/0033559 | A1 | 2/2021 | Panat et al. |
| 2021/0034906 | A1 | 2/2021 | Van Welzen et al. |
| 2021/0085988 | A1 | 3/2021 | Nin et al. |
| 2021/0186450 | A1 | 6/2021 | Vancamberg et al. |
| 2021/0213279 | A1 | 7/2021 | Rapoport et al. |
| 2021/0252289 | A1 | 8/2021 | Esteller |
| 2021/0267523 | A1 | 9/2021 | Donoghue et al. |
| 2021/0267526 | A1 | 9/2021 | Bishay et al. |
| 2021/0268265 | A1 | 9/2021 | Eder et al. |
| 2021/0272687 | A1 | 9/2021 | Klopfenstein et al. |
| 2021/0275807 | A1 | 9/2021 | Bouton |
| 2021/0280309 | A1 | 9/2021 | Klopfenstein et al. |
| 2021/0353439 | A1 | 11/2021 | Norman et al. |
| 2022/0005465 | A1 | 1/2022 | Prabhavalkar et al. |
| 2022/0117511 | A1 | 4/2022 | Shor et al. |
| 2022/0175320 | A1 | 6/2022 | Shah et al. |
| 2022/0184403 | A1 | 6/2022 | Chouinard et al. |
| 2022/0208173 | A1 | 6/2022 | Chang et al. |
| 2022/0211312 | A1 | 7/2022 | Brinkmann et al. |
| 2022/0218264 | A1 | 7/2022 | Brunner et al. |
| 2022/0240833 | A1 | 8/2022 | Oxley |
| 2022/0301563 | A1 | 9/2022 | Chang et al. |
| 2022/0370805 | A1 | 11/2022 | Cogan et al. |
| 2022/0379117 | A1 | 12/2022 | Spector |
| 2022/0413612 | A1 | 12/2022 | Gribetz |
| 2023/0059718 | A1 | 2/2023 | Hor-Lao et al. |
| 2023/0062326 | A1 | 3/2023 | Colachis et al. |
| 2023/0111217 | A1 | 4/2023 | Weiss |
| 2023/0113727 | A1 | 4/2023 | Van Der Zalm et al. |
| 2023/0210427 | A1 | 7/2023 | Rapoport et al. |
| 2023/0253104 | A1 | 8/2023 | Serruya et al. |
| 2023/0271007 | A1 | 8/2023 | Ganzer et al. |
| 2023/0320417 | A1 | 10/2023 | Renner et al. |
| 2023/0389851 | A1 | 12/2023 | Tal et al. |
| 2023/0414947 | A1 | 12/2023 | Esteller |
| 2024/0029717 | A1 | 1/2024 | Jain et al. |
| 2024/0115178 | A1 | 4/2024 | Rapoport |
| 2024/0139512 | A1 | 5/2024 | Schulhauser et al. |
| 2024/0374893 | A1 | 11/2024 | Robinson et al. |
| 2024/0399152 | A1 | 12/2024 | Powell et al. |
| 2024/0412030 | A1 | 12/2024 | Guinn et al. |
| 2025/0010070 | A1 | 1/2025 | Ganzer et al. |

FOREIGN PATENT DOCUMENTS

| | | |
|---|---|---|
| CN | 110876652 A | 3/2020 |
| KR | 20200074951 A | 6/2020 |
| WO | 2008052166 A2 | 5/2008 |
| WO | 2012143850 A1 | 10/2012 |
| WO | 2015191628 A1 | 12/2015 |
| WO | 2015195553 A1 | 12/2015 |
| WO | 2017160627 A2 | 9/2017 |
| WO | 2017196971 A1 | 11/2017 |
| WO | 2019079475 A1 | 4/2019 |
| WO | 2019152648 A1 | 8/2019 |
| WO | 2019211314 A1 | 11/2019 |
| WO | 2020008016 A1 | 1/2020 |
| WO | 2020008017 A1 | 1/2020 |
| WO | 2020142384 A1 | 7/2020 |
| WO | 2020219371 A1 | 10/2020 |
| WO | 2021021714 A1 | 2/2021 |
| WO | 2021055682 A1 | 3/2021 |
| WO | 2021162795 A1 | 8/2021 |
| WO | 2021174061 A1 | 9/2021 |
| WO | 2022011260 A1 | 1/2022 |
| WO | 2022126059 A1 | 6/2022 |

(56) References Cited

FOREIGN PATENT DOCUMENTS

WO          2022251151 A1    12/2022
WO          2024254360 A1    12/2024

OTHER PUBLICATIONS

Bridges D.C., et al., "MEA Viewer: A High-performance Interactive Application for Visualizing Electrophysiological Data," PLoS One, Feb. 9, 2018, vol. 12, No. 2, 10 pages.

Daemen J., et al., "AES Proposal: Rijndael," National Institute of Standards and Technology, 1999, 47 pages.

Judy M., et al., "A Nonlinear Signal-Specific ADC for Efficient Neural Recording," Biomedical Circuits and Systems Conference (BioCAS), 2010, pp. 17-20.

Kester Q.A., "A Cryptographic Image Encryption Technique for Facial-Blurring of Images," International Journal of Advanced Technology & Engineering Research, May 2013, vol. 3, No. 3, pp. 1-7.

Maji S., et al., "A Low-power Dual-Factor Authentication Unit for Secure Implantable Devices" IEEE Custom Integrated Circuits Conference (CICC), 2020, 10 pages, Retrieved from the Internet URL: https://arxiv.org/pdf/2004.13709.

Matsushita K., et al., "A Fully Implantable Wireless ECoG 128-Channel Recording Device for Human Brain-machine Interfaces: W-HERBS," Frontiers in Neuroscience, Jul. 30, 2018, vol. 12, No. 511, 11 pages.

Ogawa H., et al., "Rapid and Minimum Invasive Functional Brain Mapping by Real-time Visualization of High Gamma Activity During Awake Craniotomy," World Neurosurgery, Nov. 2014, 10 pages.

Pallud J., et al., Direct Electrical Bipolar Electrostimulation for Functional Cortical and Subcortical Cerebral Mapping in Awake Craniotomy. Practical Considerations, Neurochirurgie, Jun. 1, 2017, vol. 63, pp. 164-174.

Schneier B., "Description of a New Variable-Length Key, 64-Bit Block Cipher (Blowfish)," Fast Software Encryption, Cambridge Security Workshop Proceedings, Dec. 1993, pp. 191-204.

Tchoe Y., et al., "Human Brain Mapping with Multi-thousand Channel PtNRGrids Resolves Spatiotemporal Dynamics," Science Translational Medicine, Jan. 19, 2022, vol. 14, No. 628, 22 pages.

Third Party Prior Art Submission for U.S. Appl. No. 18/180,248, filed Aug. 12, 2025.

Thorpe C., et al., "A Coprime Blur Scheme for Data Security in Video Surveillance," In IEEE Transactions on Pattern Analysis and Machine Intelligence, 2013, vol. 35, No. 12, pp. 3066-3072.

Uy J., et al., "Stability of Maps of Human Motor Cortex Made with Transcranial Magnetic Stimulation," Brain Topography, Jun. 2002, vol. 14, No. 4, pp. 293-297.

Biederman W., et al., "A Fully-Integrated, Miniaturized (0.125 mm$^2$) 10.5 μW Wireless Neural Sensor," IEEE Journal of Solid-state Circuits, 2013, vol. 48, No. 4, pp. 960-970.

Coelho K., et al., "Cryptographic Algorithms in Wearable Communications: An Empirical Analysis," IEEE Communications Letters, 2019, vol. 23, No. 11, pp. 1931-1934.

Examination Report No. 1 for Australian Patent Application No. 2023230897 dated Jun. 26, 2025, 10 pages.

Ghoreishizadeh S.S., et al., "A Lightweight Cryptographic System for Implantable Biosensors," Proceedings of 2014 IEEE Biomedical Circuits and Systems Conference (BioCAS), 2014, pp. 472-475.

Hinterberger T., et al., "Voluntary Brain Regulation and Communication with Electrocorticogram Signals," Epilepsy and Behavior, Aug. 1, 2008, vol. 13, No. 2, pp. 300-306.

International Search Report and Written Opinion for Application No. PCT/US2025/019165, mailed on Jun. 6, 2025, 18 pages.

Kim H., et al., "A Configurable and Low-Power Mixed Signal SoC for Portable ECG Monitoring Applications," IEEE Transactions on Biomedical Circuits and Systems, 2014, vol. 8, No. 2, pp. 257-267.

Schwemmer M.A., et al., "Meeting Brain-Computer Interface User Performance Expectations Using a Deep Neural Network Decoding Framework," Nature Medicine, Sep. 24, 2018, vol. 24, No. 11, pp. 1669-1676.

Yanagisawa T., et al., "Electrocorticographic Control of a Prosthetic Arm in Paralyzed Patients," Annals of Neurology, 2012, vol. 71, No. 3, pp. 353-361.

Alim S.A., et al., "Some Commonly Used Speech Feature Extraction Algorithms," IntechOpen, 2018, vol. 1, 18 pages.

Anumanchipalli G.K., et al., "Speech Synthesis from Neural Decoding of Spoken Sentences," Nature, Apr. 2019, vol. 568, No. 7753, pp. 493-498.

Camara C., et al., "Security and Privacy Issues in Implantable Medical Devices: A Comprehensive Survey," Journal of Biomedical Informatics, Jun. 11, 2015, vol. 55, 45 pages.

Collobert R., et al., "A Fully Differentiable Beam Search Decoder," A preprint, Feb. 19, 2019, 11 pages.

Defossez A., et al., "Decoding Speech Perception from Non-invasive Brain Recordings," Nature Machine Intelligence, Oct. 5, 2023, vol. 5, pp. 1097-1107.

Duraivel S., et al., "High-resolution Neural Recordings Improve the Accuracy of Speech Decoding," Nature Communications, Nov. 6, 2023, vol. 14, No. 6938, 16 pages.

Haufe S., et al., "Elucidating Relations Between Fmri, Ecog and Eeg Through a Common Natural Stimulus," Publication bioR/iv. Oct. 22, 2017.

Hettick M., et al., "The Layer 7 Cortical Interface: a Scalable and Minimally Invasive Brain-computer Interface Platform," bioRxiv, Jan. 30, 2024, 42 pages.

Inclusive Technology., "Inclusive Eyegaze Education with Mygaze Eye Tracker —Discontinued," Spectronics, Feb. 25, 2025, 8 pages, Retrieved from the Internet: URL: https://www.spectronics.com.au/product/inclusive-eyegaze-education-with-mygaze-eye-tracker#mygaze.

International Preliminary Report on Patentability for Application No. PCT/US2022/78130, mailed on Apr. 25, 2024, 8 Pages.

International Preliminary Report on Patentability for the Application No. PCT/US2023/035620, mailed May 1, 2025, 9 pages.

International Preliminary Report on Patentability for the Application No. PCT/US2023/035623, mailed May 1, 2025, 9 pages.

International Preliminary Report on Patentability for the Application No. PCT/US2023/035624, mailed May 1, 2025, 9 pages.

International Preliminary Report on Patentability for the Application No. PCT/US2023/035625, mailed May 1, 2025, 7 pages.

International Preliminary Report on Patentability for the Application No. PCT/US2023/035627, mailed May 1, 2025, 8 pages.

International Preliminary Report on Patentability for the Application No. PCT/US2023/063894, mailed Sep. 19, 2024, 12 pages.

International Preliminary Reporton Patentability for the Application No. PCT/US2022/82619, mailed on Jul. 11, 2024, 9 pages.

International Search Report and Written Opinion for Application No. PCT/US2022/078130, mailed on Feb. 16, 2023, 11 pages.

International Search Report and Written Opinion for Application No. PCT/US2022/082619, mailed on Jun. 2, 2023, 16 pages.

International Search Report and Written Opinion for Application No. PCT/US2023/035620 mailed on Feb. 15, 2024, 14 pages.

International Search Report and Written Opinion for Application No. PCT/US2023/035623, mailed on Feb. 8, 2024, 10 pages.

International Search Report and Written Opinion for Application No. PCT/US2023/035624, mailed on Feb. 26, 2024, 15 pages.

International Search Report and Written Opinion for Application No. PCT/US2023/035625, mailed on Feb. 26, 2024, 13 pages.

International Search Report and Written Opinion for Application No. PCT/US2023/035627, mailed on Feb. 9, 2024, 13 pages.

International Search Report and Written Opinion for Application No. PCT/US2023/077626, mailed on Feb. 28, 2024, 12 pages.

International Search Report and Written Opinion for Application No. PCT/US2024/017647, mailed on Jun. 6, 2024, 13 pages.

International Search Report and Written Opinion for Application No. PCT/US2024/028423, mailed on Jul. 18, 2024, 13 pages.

International Search Report and Written Opinion for Application No. PCT/US2024/043449, mailed on Nov. 15, 2024, 16 pages.

(56)                 References Cited

OTHER PUBLICATIONS

International Search Report and Written Opinion for Application No. PCT/US2025/011619, mailed on Mar. 27, 2025, 13 Pages.
International Search Report and Written Opinion for the application No. PCT/US2023/063894, mailed on Sep. 29, 2023, 14 pages.
Kim T., et al., "Spatiotemporal Compression for Efficient Storage and Transmission of High-Resolution Electrocorticography Data," Annual International Conference of the IEEE Engineering in Medicine and Biology Society, Aug. 28, 2012, pp. 1012-1015.
Liu X., et al., "An Energy-Efficient Compressed Sensing-Based Encryption Scheme for Wireless Neural Recording," IEEE Journal on Emerging and Selected Topics in Circuits and Systems, Jun. 2021, vol. 11, No. 2, pp. 405-414.
META., "AI Speech Research Voicebox: Text-guided Multilingual Universal Speech Generation at Scale," Voicebox, Research by Meta AI, 2023, 8 pages, Retrieved on Feb. 25, 2025, Retrieved from the Internet: URL: https://voicebox.metademolab.com/.
Office Action for Canadian Patent Application No. 3241544, mailed Jul. 25, 2024, 3 pages.
Sorrell E., et al., "Brain-machine Interfaces: Closed-loop Control in an Adaptive System," Annual Review of Control, Robotics, and Autonomous Systems, Jan. 29, 2021, vol. 4, pp. 167-189.
Wang N.X.R., et al., "Unsupervised Decoding of Long-Term, Naturalistic Human Neural Recordings with Automated Video and Audio Annotations," Frontiers in Human Neuroscience, Apr. 21, 2016, vol. 10, No. 165, 13 pages.
International Preliminary Report on Patentability issued in International Application No. PCT/US2023/035620, 9 pages, dated May 1, 2025.
Chen et al., "Emerging Brain-to-Content Technologies From Generative AI and Deep Representation Learning (In the Spotlight)", IEEE Signal Processing Magazine, vol. 41, No. 6, pp. 94-104, Nov. 2024.
Escabi M.A., et al., "A high-density, high-channel count, multiplexed muECOG array for auditory-cortex recordings" Journal of Neurophysiology, 2014, vol. 112, No. 6, pp. 1566-1583.
Office Action for Canadian Patent Application No. 3,245,576, mailed Oct. 14, 2025, 5 pages.
Rohaut B., et al., "Uncovering Consciousness in Unresponsive ICU Patients: Technical, Medical and Ethical Considerations," Critical Care, Mar. 9, 2019, vol. 23, No. 78, 9 pages, doi:10.1186/s13054-019-2370-4.
"What are polymides?", UBE Corporation, accessed on Sep. 19, 2025, accessed at https://www.ube.com/ube/en/ contents/chemical/ ploymide/ploymide_column.html (Year: 2025).
International Preliminary Report on Patentability for Application No. PCT/US2024/043449, mailed Mar. 5, 2026, 09 pages.
Office Action for Canadian Patent Application No. 3,269,407, mailed Mar. 6, 2026, 5 pages.

* cited by examiner

310

602 Forming an electrode array

604 Forming an interposer

606 Connecting an epoxy or solder ball array electrically to the electrode array and interposer

600

INTERPOSER FOR HIGH-DENSITY AND HIGH-CHANNEL COUNT NEURAL INTERFACE

CROSS-REFERENCE TO RELATED APPLICATIONS

The present application claims priority to U.S. Provisional Patent Application No. 63/548,649, titled INTERPOSER FOR HIGH-DENSITY AND HIGH-CHANNEL COUNT NEURAL INTERFACE, filed Feb. 1, 2024, which is hereby incorporated by reference herein in its entirety.

TECHNICAL FIELD

Embodiments disclosed herein generally relate to systems and methods for an interposer that bridges finely spaced connections from an electrode array to corresponding electronics of a neural interface.

BACKGROUND

Brain-computer interfaces have shown promise as systems for restoring, replacing, and augmenting lost or impaired neurological function in a variety of contexts, including paralysis from stroke and spinal cord injury, blindness, and some forms of cognitive impairment. Multiple innovations over the past several decades have contributed to the potential of these neural interfaces, including advances in the areas of applied neuroscience and multi-channel electrophysiology, mathematical and computational approaches to neural decoding, power-efficient custom electronics and the development of application-specific integrated circuits, as well as materials science and device packaging. Nevertheless, the practical impact of such systems remains limited, with only a small number of patients worldwide having received highly customized interfaces through clinical trials.

High bandwidth brain-computer interfaces are being developed to enable the bidirectional communication between the nervous system and external computer systems in order to assist, augment, or replace neurological function lost to disease or injury. A necessary capability of any brain-computer interface is the ability to accurately decode electrophysiologic signals recorded from individual neurons, or populations of neurons, and correlate such activity with one or more sensory stimuli or intended motor response. For example, such a system may record activity from the primary motor cortex in an animal or a paralyzed human patient and attempt to predict the actual or intended movement in a specific body part; or the system may record activity from the visual cortex and attempt to predict both the location and nature of the stimuli present in the patient's visual field.

Furthermore, brain-penetrating microelectrode arrays have facilitated high-spatial-resolution recordings for brain-computer interfaces but at the cost of invasiveness and tissue damage that scale with the number of implanted electrodes. In some applications, softer electrodes have been used in brain-penetrating microelectrode arrays; however, it is not yet clear whether such approaches offer a substantially different tradeoff as compared to conventional brain-penetrating electrodes. For this reason, non-penetrating cortical surface microelectrodes represent a potentially attractive alternative and form the basis of the system described here. In practice, electrocorticography (ECoG) has already facilitated capture of high-quality signals for effective use in brain-computer interfaces in several applications, including motor and speech neural prostheses. Higher-spatial-resolution micro-electrocorticography (pECoG) therefore represents a promising combination of minimal invasiveness and improved signal quality. Therefore, it would be highly beneficial for neural devices to make use of non-penetrating cortical interfaces.

Due to many closely spaced electrodes within the neural interface, and where each electrode requires a wired connection, scalability is not easily manageable.

SUMMARY

The present disclosure generally relates to systems and methods for an interposer for a neural interface. The interposer can be designed to bridge finely spaced connections from an electrode array to corresponding electronics of the neural interface.

In some embodiments, a neural interface for subdural implantation is provided. The neural interface includes an electrode array that includes a flexible substrate, a plurality of electrodes arranged on the flexible substrate, and a first pad arranged on the flexible substrate, wherein the first pad is electrically connected to the plurality of electrodes. An interposer includes a printed circuit board (PCB), a second pad arranged on the PCB, and a plurality of connectors arranged on the PCB, wherein the plurality of connectors are electrically connected to the second pad. Solder or epoxy electrically connects the first pad and the second pad, wherein the epoxy comprises a conductive material.

In some embodiments, each of the plurality of connectors engages with a ribbon cable connector.

In some embodiments, a connector from the plurality of connectors is spaced at a distance of at least 13 mm to a subsequent connector from the plurality of connectors.

In some embodiments, each of the plurality of electrode arrays comprises 1,024 channel arrays.

In some embodiments, the electrode array is configured for at least one of recording or stimulation.

In some embodiments, the conductive material includes nickel-based particles.

In some embodiments, a method may include forming an electrode array. The method may further include forming a plurality of electrodes arranged on a flexible substrate, forming a first pad arranged on the flexible substrate, and connecting the first pad electrically to the plurality of electrodes. The method may include forming an interposer. The method may include forming a second pad arranged on a printed circuit board (PCB), forming a plurality of connectors arranged on the PCB, and connecting the plurality of connectors electrically to the second pad. The method may include connecting epoxy or solder electrically to the first pad and the second pad, wherein the epoxy comprises a conductive material.

Further features of the present disclosure, as well as the structure and operation of various embodiments, are described in detail below with reference to the accompanying drawings. It is noted that the present disclosure is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE FIGURES

The accompanying drawings, which are incorporated herein and form part of the specification, illustrate the present disclosure and, together with the description, further serve to explain the principles of the present disclosure and to enable a person skilled in the relevant art(s) to make and use embodiments described herein.

Figure 1:
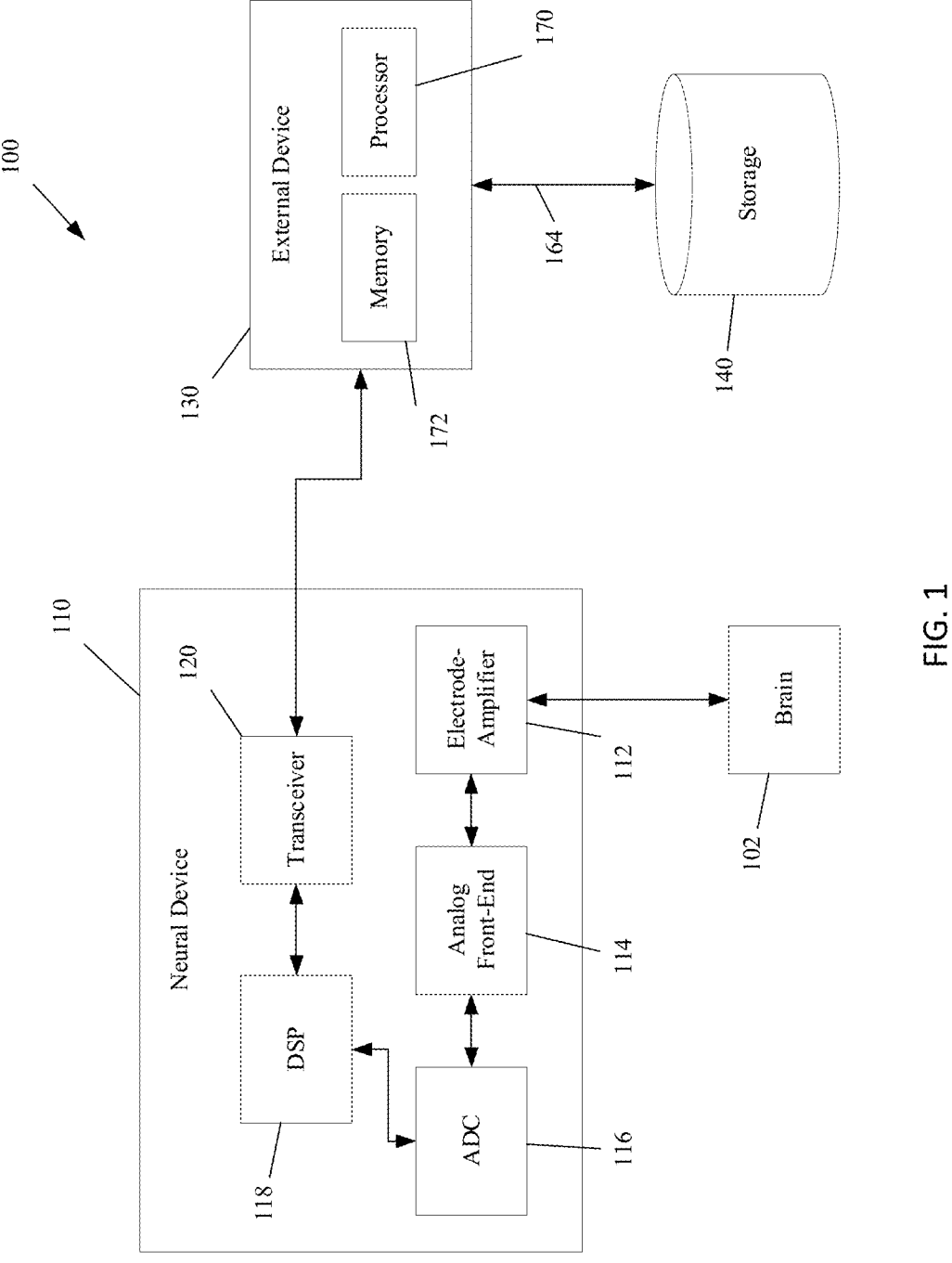

FIG. 1 illustrates an illustrative system including a neural device, according to example embodiments of the present disclosure.

Figure 2:
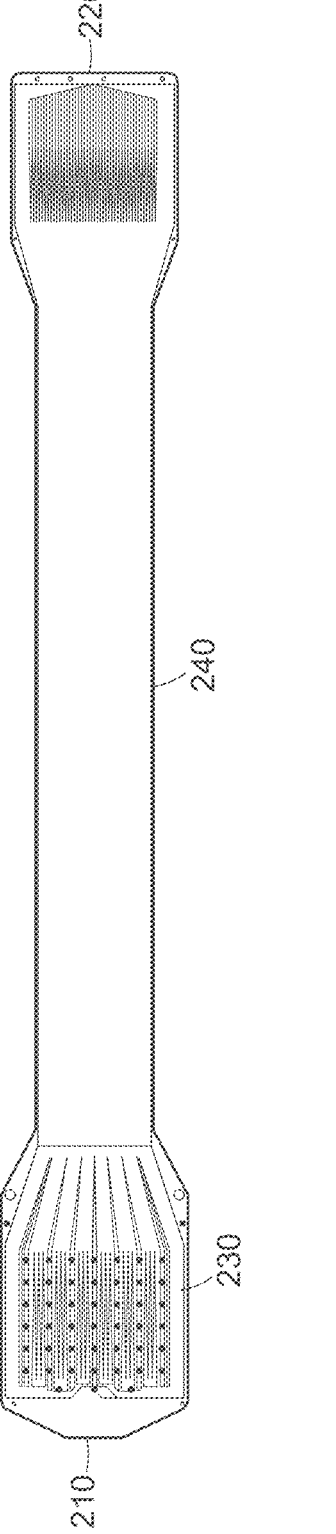

FIG. 2 illustrates an electrode array, according to example embodiments of the present disclosure.

Figure 3A:
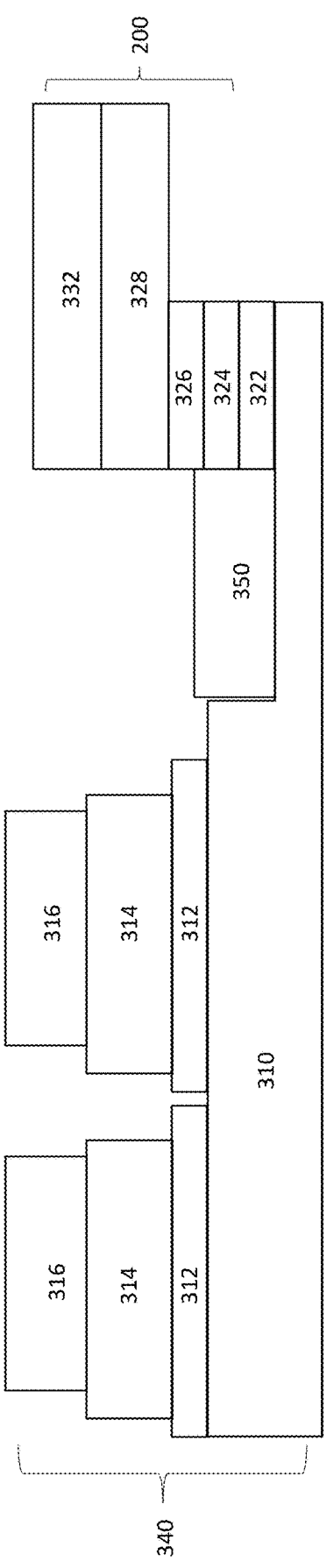

FIG. 3A illustrates a first diagram of a neural interface including an interposer connected to an electrode array, according to example embodiments of the present disclosure.

Figure 3B:
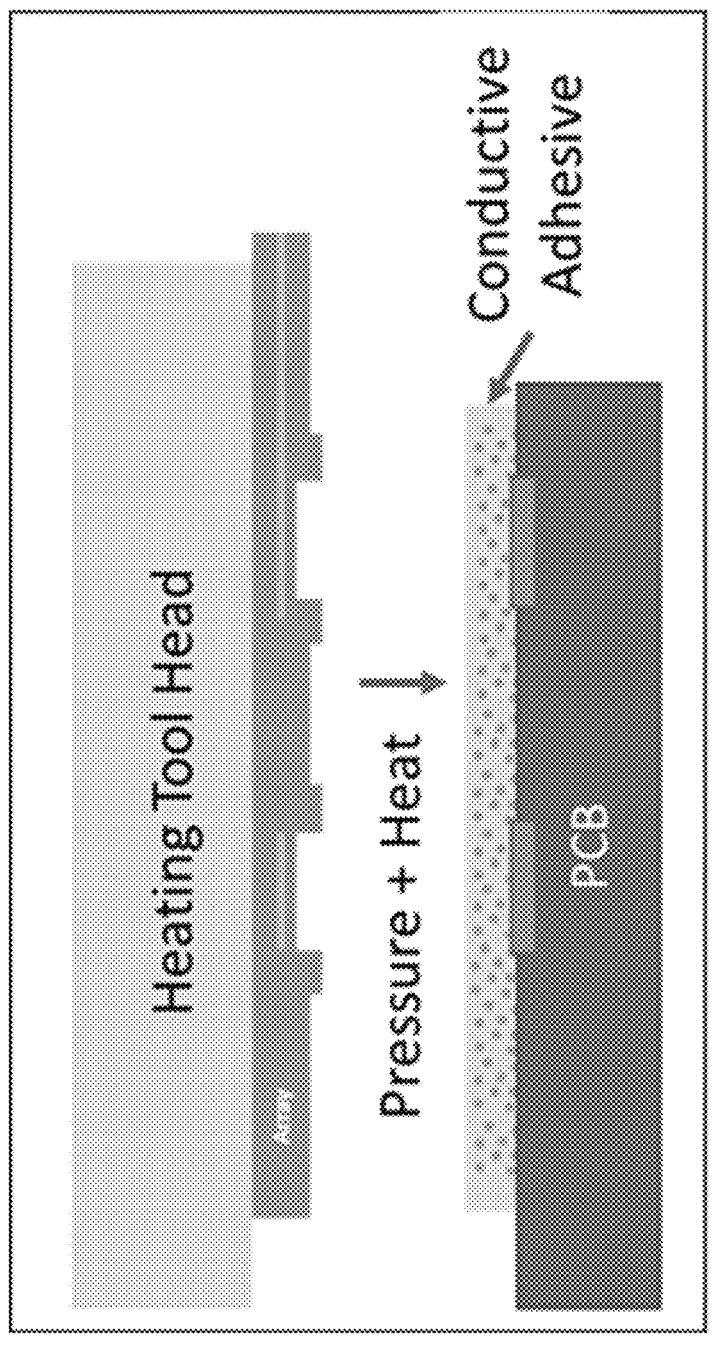

FIG. 3B illustrates a second diagram of a neural interface including an interposer connected to an electrode array, according to example embodiments of the present disclosure.

Figure 4:
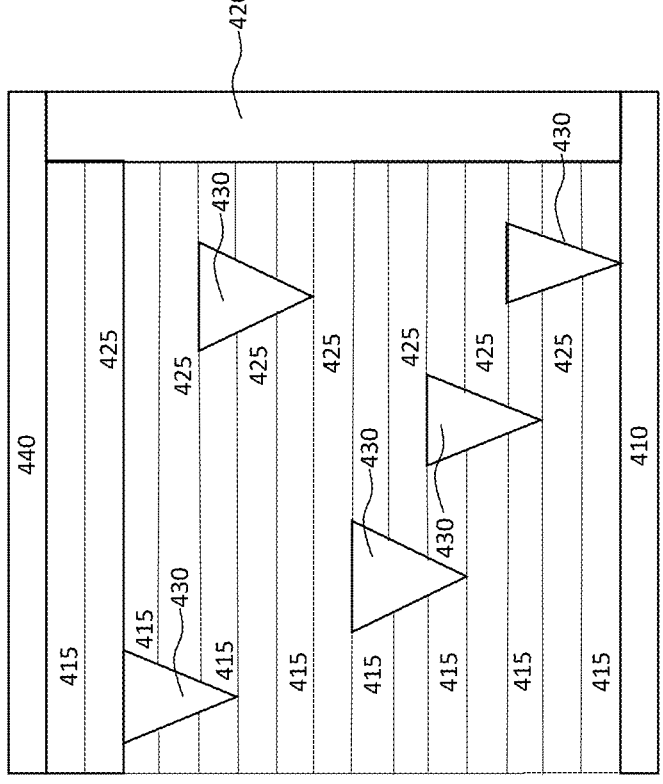

FIG. 4 illustrates a PCB to be used in an interposer, according to example embodiments of the present disclosure.

Figure 5:
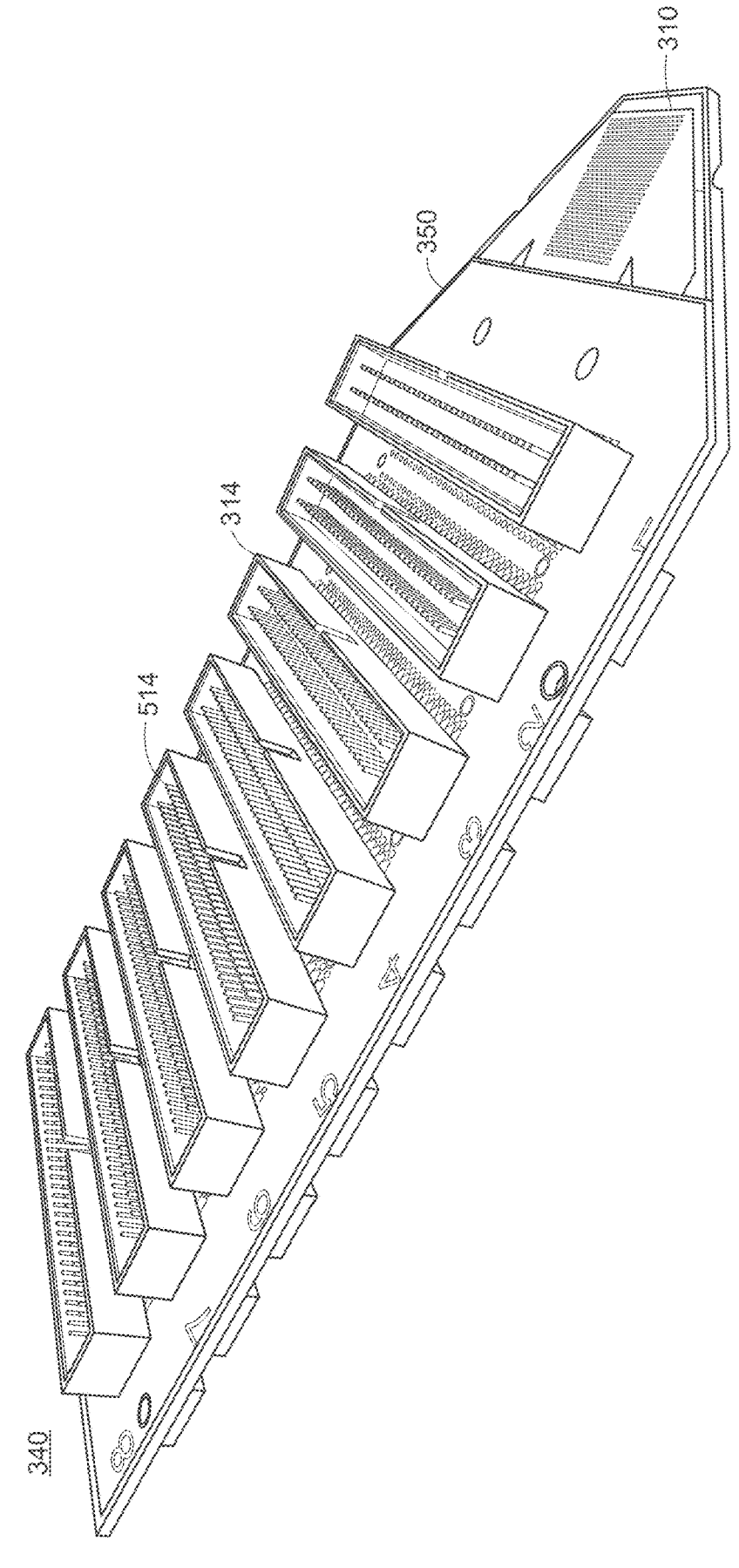

FIG. 5 illustrates an interposer including a plurality of connectors, according to example embodiments of the present disclosure.

Figure 6:
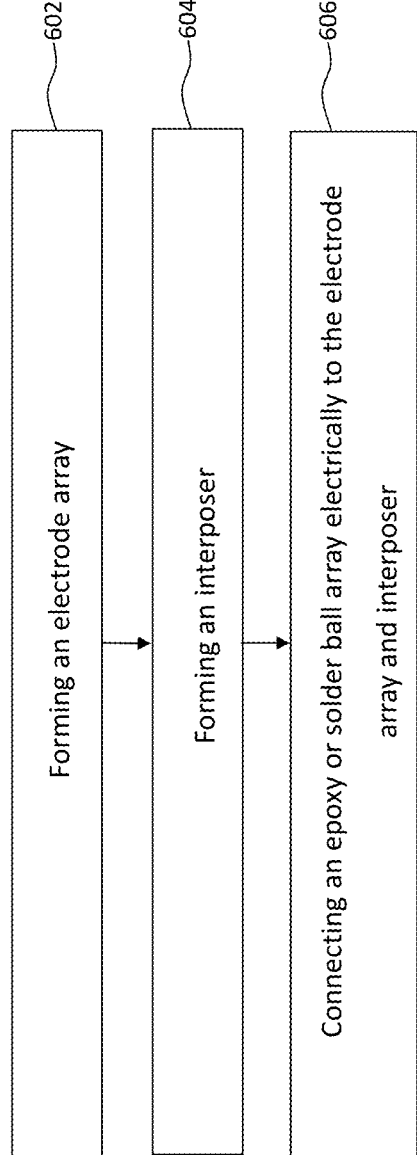

FIG. 6 is a flow diagram illustrating a method for fabricating a neural interface for subdural implantation, according to example embodiments of the present disclosure.

Figure 7:
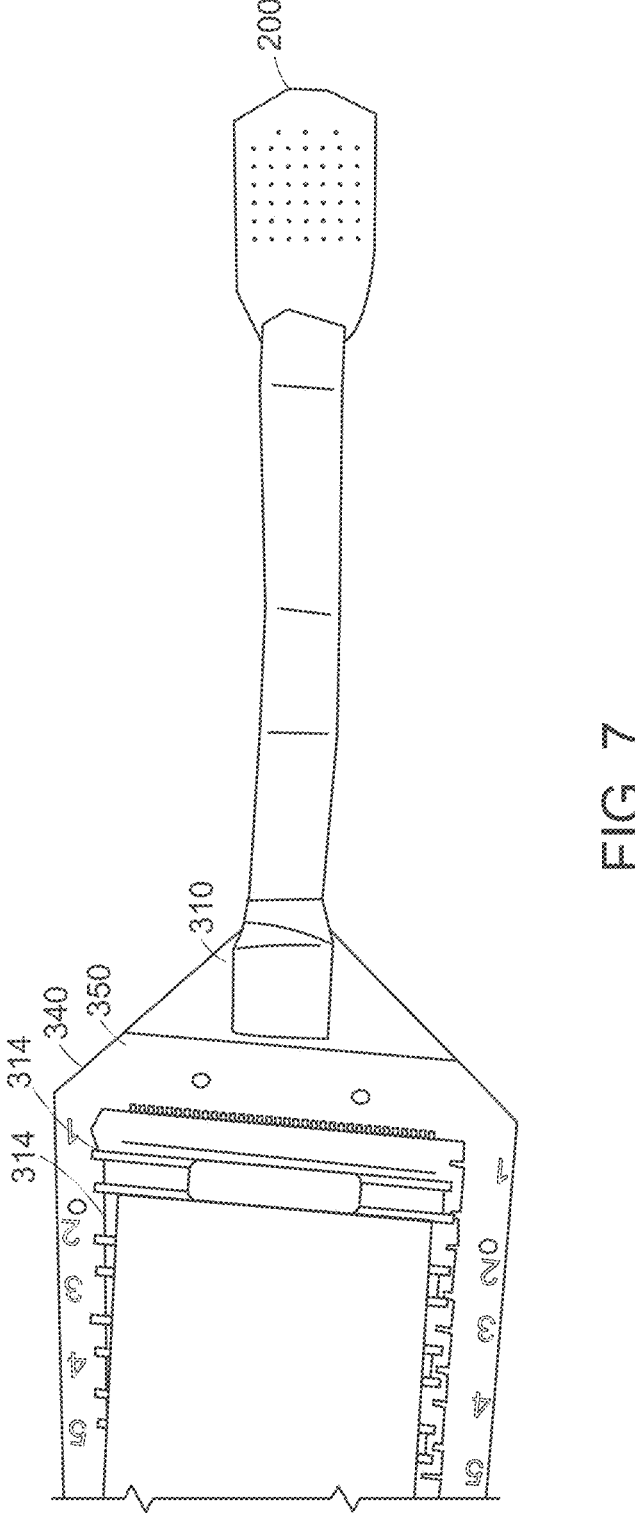

FIG. 7 illustrates an embodiment of an interposer-array subassembly system, according to example embodiments of the present disclosure.

Figures 8A, 8B:
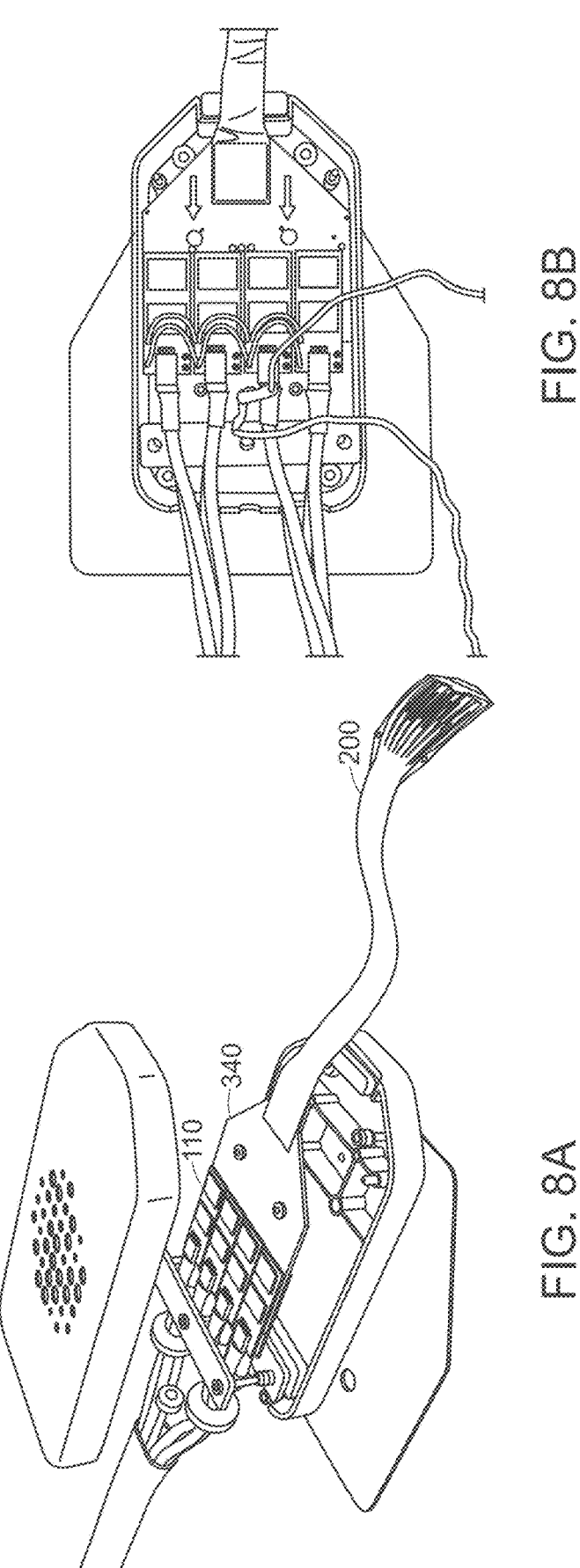

FIG. 8A illustrates an exploded view of another embodiment of an interposer-array subassembly system, according to example embodiments of the present disclosure.

FIG. 8B illustrates a cutaway view of the interposer-array subassembly system shown in FIG. 8A, according to example embodiments of the present disclosure.

Figure 9:
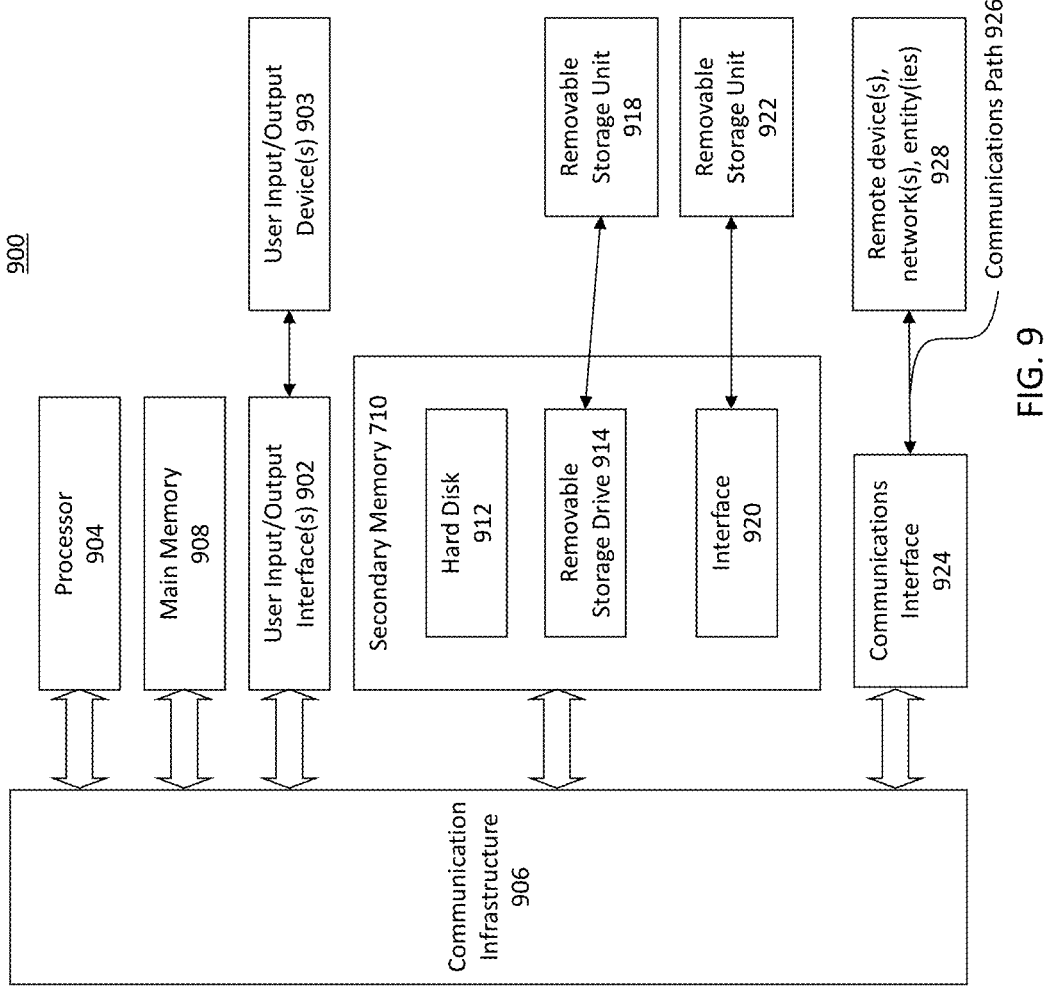

FIG. 9 is a block diagram illustrating a computing device, according to example embodiments of the present disclosure.

The features of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. Additionally, generally, the left-most digit(s) of a reference number identifies the drawing in which the reference number first appears. Unless otherwise indicated, the drawings provided throughout the disclosure should not be interpreted as to-scale drawings.

DETAILED DESCRIPTION

The present disclosure is generally related to systems and methods for an interposer that bridges finely spaced connections from an electrode array to corresponding electronics of a neural interface. The interposer may be used in a neural interface for subdural implantation.

Neural devices may sense and record brain activity, receive instructions for stimulating the user's brain, and otherwise interact with a user's brain. An interposer may be used in a neural device, as described herein, and can act as the single interconnect device between the electrodes of an electrode array and the electronics of the neural interface. The interposer may provide a more rapid connection between the electrodes and the electronics than the case with each electrode having a separately wired connection. Additionally, the interposer can use less space than conventional wiring. The interposer may provide access to the electronics of each individual electrode. By using an interposer in lieu of individually wiring each electrode to the electronics, the neural interface becomes more scalable and allows for less demanding manufacturing.

The electrode arrays of the neural interface described herein contain a large number (e.g., 1,000 or more) of electrodes that are small in size and tightly packed together. Because of their number, size, and density, electrically connecting the electrodes to the electronics and/or hardware is challenging. Further, each electrode generally has an individual, dedicated electrical connection because the electrode arrays are configured to provide electrical signals that are differentiable on an electrode-by-electrode basis. Utilizing an individual wire to connect each electrode to the electronics is challenging due to spacing issues and overall size constraints. Accordingly, the interposer proposed and described herein is designed to bridge the finely spaced connections from the electrode array to the electronics in the neural interface. The interposer can optimize the overall spacing, allowing for a single connection to the required electronics of the neural interface.

To detect cortical electrical signals or control electrical stimulation at the resolution of an individual electrode, each electrode of the electrode array is individually connected to the corresponding neural interface electronics. In typical neural interfaces, the electrodes are electrically coupled to a connector that is located on the exterior of the patient's head (i.e., head wrapping). In the present disclosure, the connector end may include the interposer and is described further in FIGS. 2-5. The interposer described herein is part of an implanted neural interface system. The interposer can be positioned on the exterior of the patient's body and serve to individually connect each electrode of the implanted electrode array to the neural interface electronics, without the need for a dedicated wire for each electrode.

The interposer may further connect the pitch of the contacts on a flexible substrate of the electrode array to the connectors, allowing the electrodes to be scalable. The interposer obviates the need for each electrode to be wired individually, which makes the manufacturing process less demanding.

Referring now to FIG. 1, there is shown a diagram of an illustrative system 100 including a neural device 110 that is communicatively coupled to an external device 130. The neural device 110 may include electrode arrays that do not penetrate the cortical surface and are minimally invasive. The external device 130 may include any device that the neural device 110 may be communicatively coupled with, such as a computer system or mobile device (e.g., a tablet, a smartphone, a laptop, a desktop, a secure server, a smartwatch, a head-mounted virtual reality device, a head-mounted augmented reality device, or a smart inductive charger device). The external device 130 may include a processor 170 and a memory 172. In some embodiments, the computer system or mobile device may include a server or a cloud-based computing system. In some embodiments, the external device 130 may further include or be communicatively coupled to storage 140. In one embodiment, the storage 140 may include a database stored on the external device 130. In another embodiment, the storage 140 may include a cloud computing system (e.g., Amazon Web Services or Azure).

The neural device 110 may include a range of electrical or electronic components. In the illustrated embodiment, the neural device 110 includes an electrode stage 112, an analog front-end stage 114, an analog-to-digital converter (ADC)

stage 116, a digital signal processing (DSP) stage 118, and a transceiver stage 120 that are communicatively coupled together. The electrode stage 112 may include an electrode array, such as is described below, that is able to physically interface with the brain 102 of the user to sense brain signals and/or apply electrical signals thereto. The analog front-end stage 114 may be configured to amplify signals that are sensed from or applied to the brain 102, perform conditioning of the sensed or applied analog signals, perform analog filtering, and so on. The front-end stage 114 may include, for example, one or more application-specific integrated circuits (ASICs) or other electronics, such as the ADC stage 116. The ADC stage 116 may be configured to convert received analog signals to digital signals and/or convert received digital signals to an analog signal to be processed via the analog front-end stage 114 and then applied via the electrode stage 112. The DSP stage 118 may be configured to perform various DSP techniques, including multiplexing of digital signals and/or reducing the data rate by performing a feature extraction of or data compression the digitized signals received via the electrode stage 112 and/or from the external device 130. For example, the DSP stage 118 may be configured to convert instructions from the external device 130 to a corresponding digital signal. The transceiver stage 120 may be configured to transfer data from the neural device 110 to the external device 130 located outside of the body of the user.

In various embodiments, the stages of the neural device 110 may provide unidirectional or bidirectional communications in half- or full-duplex mode (as indicated in FIG. 1) by and between the neural device 110 and the external device 130. In various embodiments, one or more of the stages may operate in a serial or parallel manner with other stages of the system 100. It may further be noted that the depicted architecture for the system 100 is simply intended for illustrative purposes and that the system 100 may be arranged differently (i.e., components or stages may be connected in different manners) or include additional components or stages.

The electrode stage 112 may include an electrode array. The electrode array may include 1,024 channels, but more or less may also be used. The electrodes and/or other components of the electrode stage 112 can be constructed from biocompatible conductive materials. For example, the electrodes can be constructed from titanium, platinum, or gold. Further, the neural device 110 can make use of conductive epoxies (e.g., containing nickel-based particles) or a solder ball array to electrically couple the electrode stage 112 to the other components of the neural device 110.

FIG. 2 illustrates an electrode array 200, according to some embodiments. The electrode array 200 may include a pocket 210, a connector 220, an electrode 230, and a cable 240. The electrode array 200 may contact a user's brain to sense and/or stimulate the brain.

The pocket 210 assists in allowing the neural interface to be implanted in the brain. The cable 240 connects the electrodes 230 and the connector 220 together. The electrode 230 may be an electrocorticography (ECoG) electrode or the like. The electrode 230 may be placed directly on the exposed surface of the brain to record electrical activity from the brain.

The electrode array 200 may be attached to an interposer, which is further described in FIGS. 3A and 3B.

FIGS. 3A and 3B illustrate a neural interface 300 including an interposer 340 connected to an electrode array, according to some embodiments. As noted above, the interposer 340 described herein can individually connect each electrode 230 in the electrode array 200 to the corresponding neural interface electronics. The interposer 340 may include a printed circuit board (PCB) 310, a contact pad 312, a connector 314, a ribbon connector 316, and a contact pad 322. Alternative embodiments of the interposer 340 components can include various numbers and combinations of the aforementioned components; however, solely for illustrative purposes, the embodiment of the interposer 340 depicted in FIGS. 3A and 3B includes two sets of contact pads 312, connectors 314, and ribbon connectors 316.

By using the PCB 310, the signals in the electrode array 200 connect with the electronics of the neural interface. The PCB 310 and the structure thereof is further described in FIG. 4. The contact pad 312 can include a conductive material. In some embodiments, the conductive material can include gold, copper, aluminum, or the like. The contact pad 312 is conductive and assists in facilitating the connection between the PCB 310 and the connectors 314. The contact pad 312 may be soldered or wire bonded to the PCB 310. Additionally, the contact pad 312 may formed to the PCB 310 by a manufacturing process known as flip chip.

The PCB 310 may include a plurality of connectors 314 arranged thereon. In one embodiment, the connectors 314 can be configured to engage with or connect to a ribbon connector 316. The connector 314 may be a 68-pin connector. It can be beneficial for the interposer 340 to be configured to engage with ribbon connectors 316, as opposed to bundles of wires, due to fabrication limitations. In particular, a single ribbon connector 316 may be more easily soldered compared to bundles of wires extending from each channel in the electrode array. The connectors 314 can be spaced from each other by a particular distance based on the degree to which the ribbon cables bend. In one illustrative example, the connectors 314 can be spaced from each other by about 13 mm.

In one embodiment, the connectors 314 can be spaced at a distance of approximately 13 mm apart from each other such that spacing is minimized overall. The spacing of the connectors 314 can be minimized such that the overall device. Also, each of the connectors 314 should be spaced sufficiently far apart from each other such that the ribbon connector 316 can connect the connector 314. Additionally, the ribbon connectors 316 do not bend in a direction perpendicular to the next distal connector 314 on the PCB 310 once connected, due to the appropriate spacing between the connectors 314. For example, the spacing between connectors 314 are sufficiently spaced so that the ribbon connector 316 does not get intertwined, tangled, or overlapped once connected to the connectors 314.

The PCB 310 may be connected to an electrode array 200 via the contact pad 322. The electrode array 200 may include a contact pad 326, epoxy 324 bonding the contact pad 322 and the contact pad 326, an electrode 328, and a flexible substrate 332. Alternative embodiments of the electrode 328 can include various numbers and combinations of the aforementioned components such as a plurality of electrodes 328. However, solely for illustrative purposes, the embodiment of the electrode 328 depicted in FIGS. 3A and 3B includes only one electrode 328. Each of the plurality of electrode 328 includes 1,024 channel arrays.

The contact pad 322 can include a conductive material. In one embodiment, the conductive material can include copper, titanium, gold, or the like. The contact pad 322 electrically connects the PCB 310 to the electrode 328. The epoxy 324 may be filled with particles. The particles may be conductive particles, such as nickel-based particles. The nickel-based particles may be spread throughout the epoxy 324. During the manufacturing process, pressure may be applied to the neural interface 300 to ensure a tight connection between the contact pads 322, 326 and the epoxy 324 can be cured (e.g., via application of heat or allowing the epoxy 324 to dry). The application of pressure to the epoxy 324 causes the conductive particles to line up and make contact only in the vertical direction. The epoxy 324 acts as an adhesive bonding the contact pad 322 once it has hardened. By ensuring that the particles in the epoxy are vertically aligned, the epoxy 324 provides electrical conductivity in a single direction and thereby prevents shorting between the electrodes.

The contact pad 326 can include a conductive material. In one embodiment, the conductive material can include gold or the like. The contact pad 326 electrically connects the PCB 310 and the electrode 328. The contact pad 322 and contact pad 326 may extend the length of the PCB 310. Additionally, the contact pad 322, the epoxy 324, the contact pad 326, the electrode 328, and the flexible substrate 332 may be plated onto one another. For example, plating the layers may enhance electrical conductivity, inhibit corrosion, or improve adhesion of the layers overall. Other similar manufacturing techniques, such as chemical vapor deposition (CVD), electroplating, or physical vapor deposition (PVD), may be also performed for depositing layers onto one another.

Additionally, a solder mask 350 may be arranged on the PCB 310. The solder mask 350 may be a thin layer of polymer or the like. The solder mask 350 may protect the signal layers of the PCB (further described in FIG. 4) from oxidation or shorts once the neural interface is in use. The solder mask 350 may further serve as a protection layer from external environmental influences such as dust or the like.

In some embodiments, the epoxy connection 324 can be replaced with a solder ball connection, which can be extended to the plurality of contacts 322 and 326 to form a grid array. This connection can be formed similarly by pressure and heat and the formation of an intermetallic. In this fashion, a solder contact can replace a conductive epoxy contact and can be reinforced by a non-conductive epoxy if needed in a similar fashion to the epoxy 324. Other components of the interposer can be maintained the same in this configuration or adjusted slightly to match mechanical properties of the solder, while maintaining the overall function of the interposer.

FIG. 4 illustrates a PCB 310 to be used in an interposer 340, according to some embodiments. The PCB 310 can include a series of electrically conductive layers to connect the contact pad 322 to one or more connectors 314 disposed thereon, as illustrated in FIGS. 3A and 3B. The PCB 310 itself may include a plurality of layers. For example, the PCB 310 may include a bottom overlay 410 and a top overlay 440. The PCB 310 can further include alternating layers of a signal layer 415 and a dielectric layer 425 in between the top overlay 440 and bottom overlay 410. The number of layers depicted in FIG. 4 is solely provided for illustrative purposes and alternative embodiments of the PCB 310 can have more or fewer layers, depending on the circuitry or wiring desired. The signal layer 415 can include a conductive material and be configured to connect one or more electrical connector contact pads 312 to the contact pad 322. In one embodiment, the conductive material can include copper or the like. The dielectric layers 425 may serve as a spacer or as an insulator between the alternating signal layers 415 and may be non-conductive.

The PCB 310 may connect components to one another in a circuit and may include the signal layers 415 with traces patterned thereon and the dielectric layers 425. In one embodiment, the trace width on the signal layer 415 may be approximately 0.002 inches and include a 0.003 inches space between the traces. In this embodiment, it can be beneficial of the traces to be sized and spaced in this manner to provide the best yield for the PCB 310. In particular, it can be beneficial to minimize the overall thickness of the PCB 310 as the entire neural interface is inserted into the brain of the patient.

Additionally, in between the top overlay 440 and the bottom overlay 410 may be a thru-hole 420. Alternatively, microvias 430 may be formed throughout the PCB 310. The microvia 430, also referred to as plated-thru holes, may be used as opposed to a thru-hole 420, or in addition. The microvia 430 connects a layer above and/or below instead of drilling one hole through out all the layers. The microvia 430 may be stacked to connect the above and/or below layers such that the multiple layers of the PCB 310 are connected. The overall thickness of the PCB 310 may depend on the fabrication process of the PCB 310.

FIG. 5 illustrates an interposer 340, including a plurality of connectors, according to some embodiments. The interposer 340 may include a PCB 310, a solder mask 350, and a plurality of connectors 314. The plurality of connectors 314 may include a plurality of pins 514 such that the connector 314 may accept a connector, such as a ribbon connector, as described in FIGS. 3A and 3B.

FIG. 6 is a flow diagram illustrating a method 600 for fabricating a neural interface for subdural implantation, according to some embodiments. At 602, an electrode array may be formed. The electrode array may be formed by forming a plurality of electrodes on a flexible substrate. A first pad may be formed on the flexible substrate. The first pad may be electrically connected to the plurality of electrodes. For example, as depicted in FIGS. 3A and 3B, an electrode 328 may be formed on a flexible substrate 332. A contact pad 326 may be formed on the flexible substrate 331 and is electrically connected to the electrode 328.

At 604, an interposer may be formed. The interposer may be formed by forming a second pad on a PCB. A plurality of connectors may be formed on the PCB. The plurality of connectors may be electrically connected to the second pad. For example, as depicted in FIGS. 3A and 3B, a contact pad 312 may be formed on a PCB 310. A connector 314 may be formed on the PCB 310. The connector 314 is electrically connected to the contact pad 312.

At 606, an epoxy may be electrically connected to the first pad of the electrode array to the second pad of the interposer. The epoxy may include a conductive material. For example, as depicted in FIGS. 3A and 3B, an epoxy 324 may be electrically connected to a contact pad 326 and contact pad 312.

FIG. 7 demonstrates one embodiment of the interposer-array subassembly system reduced to practice, including the interposer 340, PCB 310, solder mask with defined edge 350, connectors 314 (including a ribbon cable designed to mate to the connector), and electrode array 200. In this embodiment the epoxy method depicted in FIG. 6 can be utilized to bond and electrically connect the array 200 to the interposer 340.

FIG. 8A and FIG. 8B demonstrate another embodiment of the interposer-array subassembly system, depicted as an exploded view (FIG. 8A) and cutaway view (FIG. 8B). This embodiment contains the array 200, the interposer 340, and other components of the neural device 110 including amplifiers, analog front-end, ADC, DSP, and transceiver contained in the PCB-chip assemblies (PCBAs) designed to mate with the interposer as shown. Cables connect the PCBAs to outside devices (not shown) to form the overall system 100 as depicted in FIG. 1. While specific PCBA configurations are illustrated herein, these configurations are only provided for illustrative purposes and other embodiments of PCBA configurations are within the scope of the present disclosure.

Various embodiments may be implemented, for example, using one or more well-known computer systems, such as computer system 900 shown in FIG. 7. For example, the illustrative system 100 may be implemented using combinations or sub-combinations of computer system 900. Also, or alternatively, one or more computer systems 900 may be used, for example, to implement any of the embodiments discussed herein, as well as combinations and sub-combinations thereof.

Computer system 900 may include one or more processors (also called central processing units, or CPUs), such as a processor 904. Processor 904 may be connected to a communication infrastructure or bus 906.

Computer system 900 may also include user input/output device(s) 903, such as monitors, keyboards, pointing devices, etc., which may communicate with communication infrastructure 906 through user input/output interface(s) 902.

One or more of processors 904 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 900 may also include a main or primary memory 908, such as random-access memory (RAM). Main memory 908 may include one or more levels of cache. Main memory 908 may have stored therein control logic (i.e., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, a tape backup device, and/or any other storage device/drive.

Removable storage drive 914 may interact with a removable storage unit 918. Removable storage unit 918 may include a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 may read from and/or write to removable storage unit 918.

Secondary memory 910 may include other means, devices, components, instrumentalities, or other approaches for allowing computer programs and/or other instructions and/or data to be accessed by computer system 900. Such means, devices, components, instrumentalities, or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 900 may further include a communication or network interface 924. Communication interface 924 may enable computer system 900 to communicate and interact with any combination of external devices, external networks, external entities, etc. (individually and collectively referred to as external or remote devices 928). For example, communication interface 924 may allow computer system 900 to communicate with external or remote devices 928 over communications path 926, which may be wired and/or wireless (or a combination thereof), and which may include any combination of LANs, WANs, the Internet, etc. Control logic and/or data may be transmitted to and from computer system 900 via communication path 926.

Computer system 900 may also be any of a personal digital assistant (PDA), desktop workstation, laptop or notebook computer, netbook, tablet, smart phone, smart watch or other wearable appliance, part of the Internet-of-Things, and/or embedded system, to name a few non-limiting examples or any combination thereof.

Computer system 900 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 900 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats, or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 900, main memory 908, secondary memory 910, and removable storage units 918 and 922, as well as tangible articles of manufacture embodying any combination of the foregoing. Such control logic, when executed by one or more data processing devices (such as computer system 900 or processor(s) 904), may cause such data processing devices to operate as described herein.

Based on the teachings contained in this disclosure, it will be apparent to persons skilled in the relevant art(s) how to make and use embodiments of this disclosure using data processing devices, computer systems, and/or computer architectures other than that shown in FIG. 9. In particular, embodiments may operate with software, hardware, and/or operating system implementations other than those described herein.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and may be contained on a variety of computer-readable storage media. Illustrative computer-readable storage media include, but are not limited to (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification; a study of the drawings are included within the true spirit and scope of the present disclosure. It is therefore intended that the following appended claims include all such modifications, permutations, and equivalents as fall within the true spirit and scope of these teachings.

The invention claimed is:

1. A neural interface for subdural implantation, the neural interface comprising:

an electrode array comprising:

a flexible substrate, a plurality of electrodes arranged on the flexible substrate, and a first pad arranged on the flexible substrate, wherein the first pad is electrically connected to the plurality of electrodes;

an interposer comprising:

a printed circuit board (PCB), a second pad arranged on the PCB, and a plurality of connectors arranged on the PCB, wherein the plurality of connectors are electrically connected to the second pad; and a conductive material electrically connecting the first pad and the second pad, wherein the conductive material is directionally conductive.

2. The neural interface of claim 1, wherein each of the plurality of connectors comprises pins for accepting a ribbon cable connector.

3. The neural interface of claim 1, wherein a connector from the plurality of connectors is spaced at a distance of at least 13 mm to a subsequent connector from the plurality of connectors.

4. The neural interface of claim 1, wherein the first pad is soldered or bonded to each of the plurality of electrodes.

5. The neural interface of claim 1, wherein each of the plurality of electrodes comprises 1,024 channel arrays.

6. The neural interface of claim 1, wherein the electrode array is configured for at least one of recording or stimulation.

7. The neural interface of claim 1, wherein the conductive material includes nickel-based particles.

8. The neural interface of claim 1, wherein the first pad and the second pad comprise gold.

9. The neural interface of claim 1, wherein the first pad and the second pad are connected via epoxy or solder, the epoxy or the solder comprising the conductive material.

10. A method of fabricating a neural interface for subdural implantation, the method comprising:

forming an electrode array comprising:

forming a plurality of electrodes arranged on a flexible substrate, forming a first pad arranged on the flexible substrate, and connecting the first pad electrically to the plurality of electrodes;

forming an interposer comprising:

forming a second pad arranged on a printed circuit board (PCB), forming a plurality of connectors arranged on the PCB, and connecting the plurality of connectors electrically to the second pad; and electrically connecting the first pad and the second pad via a conductive material, wherein the conductive material is directionally conductive.

11. The method of claim 10, wherein each of the plurality of connectors comprises pins for accepting a ribbon cable connector.

12. The method of claim 10, wherein a connector from the plurality of connectors is spaced at a distance of at least 13 mm to a subsequent connector from the plurality of connectors.

13. The method of claim 10, further comprising:

soldering or bonding the first pad to the plurality of electrodes.

14. The method of claim 10, wherein the electrode array comprises a 1,024 channel array.

15. The method of claim 10, wherein the electrode array is configured for at least one of recording or stimulation.

16. The method of claim 10, wherein the conductive material includes nickel-based particles.

17. The method of claim 10, wherein the first pad and the second pad comprise gold.

18. The method of claim 10, wherein the first pad and the second pad are connected via epoxy or solder, the epoxy or the solder comprising the conductive material.

19. An interposer comprising:

a printed circuit board (PCB);

a first pad is arranged on the PCB;

a plurality of connectors, wherein each of the plurality of connectors are electrically connected to the first pad;

a second pad electrically connected to the first pad via a conductive material; and an electrode array comprising:

a flexible substrate, and a plurality of electrodes on the flexible substrate, wherein the second pad is arranged on the flexible substrate and electrically connected to the plurality of electrodes.

20. The interposer of claim 19, wherein the first pad is soldered or bonded to the plurality of electrodes.

21. The interposer of claim 19, wherein the plurality of electrodes comprises a 1,024 channel array.

22. The interposer of claim 19, wherein the plurality of electrodes is configured for at least one of recording or stimulation.

23. The interposer of claim 19, wherein each of the plurality of connectors comprises pins for accepting a ribbon cable connector.

24. The interposer of claim 19, wherein a connector from the plurality of connectors is spaced at a distance of at least 13 mm to a subsequent connector from the plurality of connectors.

25. The interposer of claim 19, wherein the conductive material includes nickel-based particles.

26. The interposer of claim 19, wherein the first pad and the second pad comprise gold.

27. The interposer of claim 19, wherein the first pad and the second pad are connected via epoxy or solder, the epoxy or the solder comprising the conductive material.

\* \* \* \* \*